United States Patent [19]

Hattori

[11] 4,218,938
[45] Aug. 26, 1980

[54] CONTROL SYSTEM FOR A DIFFERENTIAL GEAR LOCK MECHANISM

[75] Inventor: Masaharu Hattori, Tokyo, Japan

[73] Assignee: Kabushiki Kaisha Komatsu Seisakusho, Tokyo, Japan

[21] Appl. No.: 928,377

[22] Filed: Jul. 27, 1978

[30] Foreign Application Priority Data

Jul. 25, 1977 [JP] Japan .............................. 52/98276[U]

[51] Int. Cl.² .............................................. F16H 1/44
[52] U.S. Cl. ...................................... 74/710.5; 74/365
[58] Field of Search ...................... 74/710.5, 711, 364, 74/365

[56] References Cited

U.S. PATENT DOCUMENTS

| | | | |
|---|---|---|---|
| 1,938,848 | 12/1933 | Matthews | 74/710.5 X |
| 2,760,610 | 8/1956 | Prachar | 74/365 X |
| 3,498,154 | 3/1970 | Muller-Berner | 74/710.5 |
| 3,627,072 | 12/1971 | Smirl | 74/711 X |
| 3,788,166 | 1/1974 | Hart et al. | 74/710.5 |

Primary Examiner—Andrew V. Kundrat
Attorney, Agent, or Firm—Armstrong, Nikaido, Marmelstein & Kubovcik

[57] ABSTRACT

A control system for a differential gear lock mechanism including a power transmission having at least two forward drives and a backward drive and a manually operated speed change lever associated with said power transmission.

The control system comprises a differential gear, an air tank containing compressed air therein, a conduit for connecting said air tank with said differential gear, a valve disposed in said conduit for selectively supplying compressed air to said differential gear when actuated, and a solenoid-controlled valve disposed in said conduit for interrupting air supply to said differential gear when actuated wherein said solenoid-controlled valve is adapted to be actuated when said speed change lever is shifted to a higher drive.

3 Claims, 2 Drawing Figures

CONTROL SYSTEM FOR A DIFFERENTIAL GEAR LOCK MECHANISM

BACKGROUND OF THE INVENTION

This invention relates to a control system for a differential gear lock mechanism employed in motor scrapers or the like.

A conventional differential gear lock mechanism is constructed such that whenever a pedal for locking the differential gear is stepped down by an operator the lock mechanism is rendered operative even if the motor vehicle is under any condition.

For this reason, if the pedal for locking the differential gear is accidentally depressed by an operator when the vehicle is running at a high speed, the differential gear lock mechanism is rendered operative so as to make steering of the vehicle different thereby affecting the safe operation of the motor vehicle. Furthermore, the engagement of gears of the differential gear lock mechanism at high speeds tends to reduce the useful life of the components thereof.

SUMMARY OF THE INVENTION

It is therefore an object of the present invention to provide a control system for a differential gear lock mechanism wherein the lock mechanism for differential gear may not be permitted to operate when a transmission remains in a high speed range even if a pedal for locking the differential gear is depressed accidentally by an operator thereby assuring a safe operation of the vehicle at high speeds.

Another object of the present invention is to provide a control system for a differential gear lock mechanism wherein possible damages to the differential gear lock mechanism can be eliminated when the transmission gear is in a high speed range.

In accordance with an aspect of the present invention, there is provided a control system for a differential gear lock mechanism including power transmission means having at least two forward drives and a backward drive and a manually operable speed change lever associated with said power transmission means, said control system comprising differential gear means, an air tank containing compressed air therein, conduit means for connecting said air tank with said differential gear means, valve means disposed in said conduit means for selectively supplying compressed air to said differential gear means when actuated, solenoid-controlled valve means disposed in said conduit means for interrupting air supply to said differential gear means when actuated, a plurality of switch means each being adapted to be turned on in response to the shifting of the speed change lever, relay means connected to said solenoid-controlled valve means and at least one of said switch means for higher drive, said relay means being adapted to actuate said solenoid-controlled valve means when one of said higher drive switch means is turned on, and electric source means connected to said switch means and said relay means.

Upon actuation of the solenoid-operated valve when the speed change lever is shifted to its high speed drive, the compressed air from the air tank is blocked by the solenoid-operated valve thereby interrupting the supply of compressed air to the differential gear and rendering the differential gear lock mechanism inoperative.

The above and other objects, features and advantages of the present invention will be readily apparent from the following description taken in conjunction with the accompanying drawings.

DETAILED DESCRIPTION OF THE INVENTION

Figure 1:
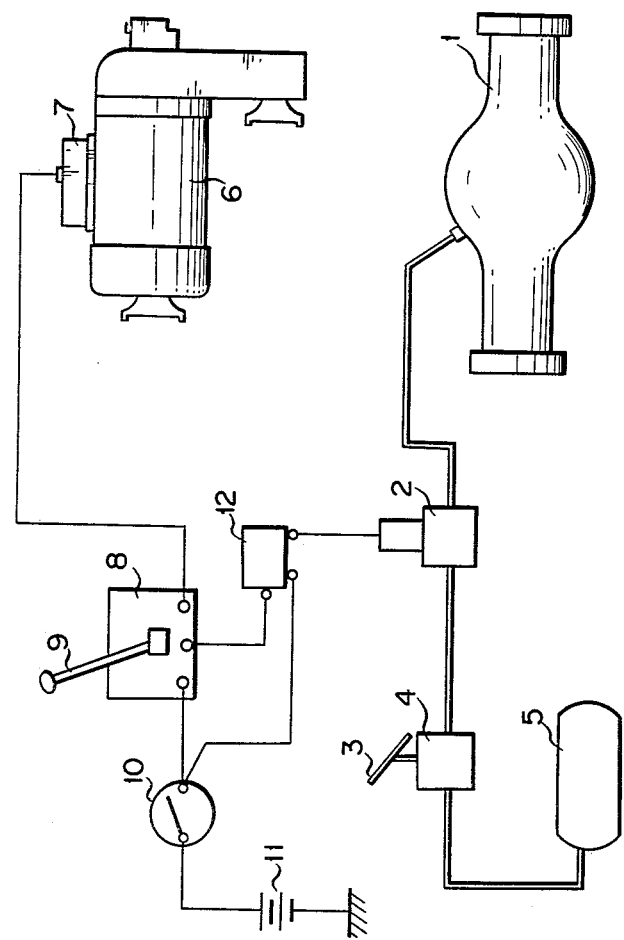
FIG. 1 is a schematic illustration of a differential gear lock mechanism according to the present invention.
Figure 2:
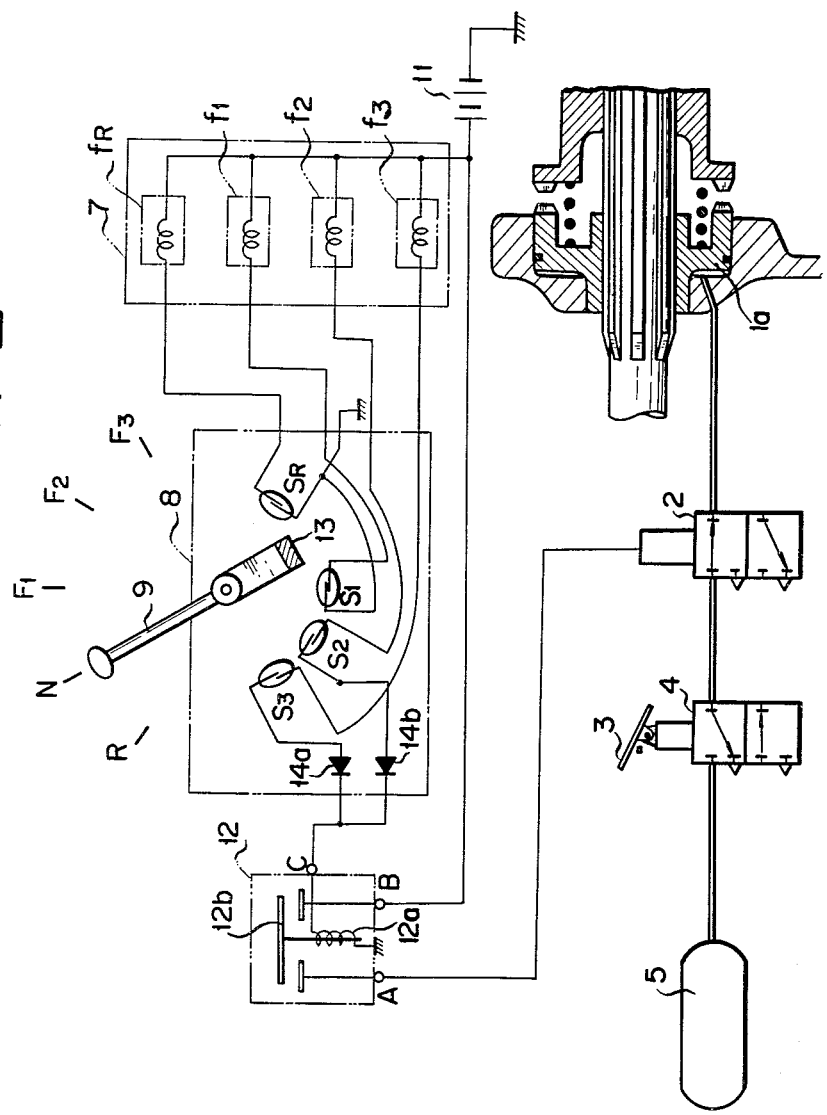
FIG. 2 is a view showing an electric circuit thereof.

The present invention will now be described in detail by way of embodiment with reference to the accompanying drawings.

In the drawings, reference numeral 1 denotes a differential gear provided with a lock mechanism which is pneumatically controlled and which has a conduit connected to an air tank 5 through a differential gear lock valve 4 operable by a solenoid-operated valve 2 and a pedal 3 for operating the differential gear lock mechanism.

Reference numeral 6 denotes a transmission gear, 7 a control valve for controlling the transmission gear, 8 a transmission control box operable by a speed change lever 9, 10 a main switch, 11 an electric power supply and 12 a relay. The solenoid of the solenoid-operated valve 2 is connected through the relay 12 with the transmission control box 8 and the main switch 10.

Fixedly secured to the leading end of the speed change lever 9 of the transmission control box 8 is a magnet 13 for detection along the path of movement of which there are provided reed switches $S_R$, $S_1$, $S_2$ and $S_3$ that are turned on when the detector magnet 13 is moved close to them. Further, reference character $S_R$ denotes a reed switch for backward drive, $S_1$ for forward drive 1st speed, and $S_2$ and $S_3$ for forward drive 2nd and 3rd speeds, respectively. Reference characters $f_R$, $f_1$, $f_2$ and $f_3$ denote solenoids for solenoid-operated valves for first, second and third speed ranges of the transmission gear.

Out of the above-mentioned reed switches, the earth terminals of the high speed reed switches $S_2$ and $S_3$ are connected through diodes 14a and 14b with "C" terminal of the relay 12. The "C" terminal of the relay 12 is earthed through a coil 12a for a contact. The relay 12 has "A" and "B" terminals which are electrically connected by a movable contact 12b when the coil 12a is energized. The "A" terminal is connected with the solenoid of the solenoid-operated valve 2 whilst the "B" terminal is connected with the power supply 11.

In the above-mentioned arrangement, when the speed change lever 9 is located at a neutral (N) position, a backward drive position (R) and a forward drive first speed ($F_1$) position, and as the pedal 3 for locking the differential gear lock mechanism is depressed by an operator, the compressed air in the air tank 5 is supplied into the differential gear lock valve 4 and the solenoid-operated valve 2, so as to push a lock plate 1a located in the differential gear 1 thereby locking the latter. In this case, the differential gear lock mechanism is rendered on or off by manipulating the differential gear lock pedal 3.

When the speed change lever 9 is set at forward drive second speed ($F_2$) position, the reed switch $S_2$ within the control box 8 is turned on by the action of the detector magnet 13, an electric current flows from the power supply 11 through the solenoid $f_2$ of the solenoid-operated valve, the reed switch $S_2$, the diode 14b, the "C" terminal of the relay 12, the coil 12a for the contact and the earth, energizing the solenoid-operated valve for 2nd speed so as to set the transmission gear 6 at the forward drive second speed thereby enabling the motor vehicle to run at a high speed. At that time, the relay 12 is energized so as to connect the "A" and "B" terminals to change over the solenoid-operated valve 2 to its open position. Therefore, even if the pedal 3 for locking the differential gear is depressed by the operator, the differential gear lock mechanism cannot be rendered operative.

When the speed change lever 9 is set at the forward drive third speed ($F_3$) position, the reed switch $S_3$ is turned on to enable the motor vehicle to run at a high speed or the forward drive third speed, and at the same time, as in the case of the above-mentioned forward drive second speed, the "A" and "B" terminals of the relay 12 are electrically connected to permit the solenoid-operated valve 2 to assume its open position so that the differential gear lock mechanism cannot be rendered operative.

As can be seen from the foregoing description, according to the present invention, the control system for the differential gear lock mechanism is constructed such that any of the reed switches $S_R$ for backward drive, $S_1$ for forward drive 1st speed, $S_2$ for 2nd speed and $S_3$ for 3rd speed is turned on by moving or changing over the speed change lever 9 set within the transmission control box 8 so as to enable the transmission gear 6 to be changed over through any of the solenoid valves located within the control valve 7, and the differential gear comprises a differential gear lock mechanism which is rendered operative by supplying the compressed air from the air tank 5 to it through the differential gear lock valve 4. Further, the solenoid-operated valve 2 is installed which has an open position and a position where it is permitted to communicate with the air circuit of the differential gear lock mechanism, and the control system for the differential gear lock mechanism is constructed such that the earthing side of the high speed reed switches $S_2$ and $S_3$ is connected with the coil 12a of the relay 12 and the solenoid of the solenoid-operated valve 2 is connected with the power supply 11 through the switch that can be changed over by turning the coil 12a of the relay 12 on and off. Therefore, even if the differential gear lock pedal 3 is depressed accidentally when the vehicle is running at a high speed, the differential gear lock mechanism cannot be rendered operative thereby achieving an improved safety during running at high speeds. Furthermore, since there is no possibility of accidentally rendering the differential gear lock mechanism operative during running at high speed, the differential gear lock mechanism can be protected from damages.

It is to be understood that the above description is by way of example only, and that details for carrying the invention into effect may be varied without departing from the scope of the invention claimed.

What is claimed is:

1. A control system for a differential gear lock mechanism including power transmission means having at least two forward drives and a backward drive and a manually operable speed change lever associated with said power transmission means, said control system comprising differential gear means, an air tank containing compressed air therein, conduit means for connecting said air tank with said differential gear means, valve means disposed in said conduit means for selectively supplying compressed air to said differential gear means when actuated, solenoid-controlled valve means disposed in said conduit means for interrupting air supply to said differential gear means when actuated, a plurality of reed switches each being adapted to be turned on in response to the shifting of the speed change lever, relay means connected to said solenoid-controlled valve means and at least one of said reed switches for higher drive, said relay means being adapted to actuate said solenoid-controlled valve means when one of said higher drive reed switches is turned on, and electric source means connected to at least one of said reed switches and said relay means.

2. A control system for a differential gear lock mechanism as defined in claim 1 further comprising control valve means connected with said switch means for shifting said power transmission means from one drive to another in response to the shifting of the speed change lever.

3. A control system for a differential gear lock mechanism including power transmission means having at least two forward drives and a backward drive and a manually operable speed change lever associated with said power transmission means, a magnet formed at one end of the speed change lever, said control system comprising differential gear means, an air tank containing compressed air therein, conduit means for connecting said air tank with said differential gear means, valve means disposed in said conduit means for selectively supplying compressed air to said differential gear means when actuated, solenoid-controlled valve means disposed in said conduit means for interrupting air supply to said differential gear means when actuated, a plurality of reed switches each being adapted to be turned on by the magnet of the speed change lever in response to the shifting of the speed change lever, relay means connected to said solenoid-controlled valve means and at least one of said reed switches for higher drive, said relay means being adapted to actuate said solenoid-controlled valve means when one of said higher drive reed switches is turned on, and electric source means connected to at least one of said reed switches and said relay means.

* * * * *